United States Patent
Kim et al.

(10) Patent No.: US 7,325,941 B2
(45) Date of Patent: Feb. 5, 2008

(54) BACKLIGHT ASSEMBLY

(75) Inventors: Jung Soo Kim, Gumi-si (KR); Eun Seong Min, Suwon-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 147 days.

(21) Appl. No.: 11/253,650

(22) Filed: Oct. 20, 2005

(65) Prior Publication Data
US 2007/0002564 A1   Jan. 4, 2007

(30) Foreign Application Priority Data
Oct. 21, 2004   (KR) .................. P 10-2004-0084511

(51) Int. Cl.
*F21S 4/00* (2006.01)
(52) U.S. Cl. ............. 362/225; 362/221; 362/222; 362/223; 362/224; 362/330; 362/362; 362/630; 362/631; 362/632; 362/633; 362/634
(58) Field of Classification Search .............. 362/97, 362/330, 221–225, 362, 607, 630–634, 559; 349/70
See application file for complete search history.

(56) References Cited
U.S. PATENT DOCUMENTS

| | | | |
|---|---|---|---|
| 6,522,543 B2 * | 2/2003 | Kurihara et al. ........... 361/704 |
| 6,583,556 B2 * | 6/2003 | Oishi et al. ................ 313/495 |
| 6,902,285 B2 * | 6/2005 | Eiraku et al. ................ 362/26 |
| 7,057,678 B2 * | 6/2006 | Ishida et al. ................ 349/58 |
| 7,106,392 B2 * | 9/2006 | You ............................ 349/58 |
| 7,207,710 B2 * | 4/2007 | Kim ........................... 362/634 |

* cited by examiner

*Primary Examiner*—Stephen F. Husar
*Assistant Examiner*—Meghan K. Dunwiddie
(74) *Attorney, Agent, or Firm*—McKenna, Long & Aldridge LLP

(57) ABSTRACT

A backlight assembly having protrusions in a side surface between a side supporter and a cover shield is provided. The protrusions prevent the cover shield from being deformed by an external force and prevent disconnection of a wire between the side supporter and the cover shield. The backlight assembly includes a plurality of light sources; a side supporter having a plurality of U-shaped curved portions which align with and support the light sources; a PCB having a plurality of inverters mounted thereon; a plurality of wires which connect the inverter and an electrode of each light source; a cover shield with an edge for protecting end portions of the light sources and a second edge for protecting the PCB; and an extension formed on one surface of the side supporter opposite to the cover shield edge.

8 Claims, 6 Drawing Sheets

BACKLIGHT ASSEMBLY

This application claims the benefit of the Korean Patent Application No. P2004-84511, filed on Oct. 21, 2004, which is hereby incorporated by reference for all purposes as if fully set forth herein.

BACKGROUND OF THE INVENTION

1. Field of the Invention

The present invention relates to a backlight assembly of a liquid crystal display (LCD) device, and more particularly, to a backlight assembly of a liquid crystal display (LCD) device, in which protrusions are formed at a contact surface between a side supporter and a cover shield, to prevent deformation of the cover shield from an external force, and to prevent disconnection of a wire positioned between the side supporter and the cover shield.

2. Discussion of the Related Art

Recently, efforts have been undertaken to research and develop various flat display devices such as liquid crystal displays (LCD), plasma display panels (PDP), electroluminescent displays (ELD), and vacuum fluorescent displays (VFD). Some species of flat display devices have already been applied to displays for various applications.

Among the various flat display devices, liquid crystal display (LCD) devices have been most widely used because of their thin profile, low weight, and low power consumption. The LCD devices provide a substitute for a Cathode Ray Tube (CRT). In addition to mobile type LCD devices, such as displays for notebook computers, LCD devices have been developed for computer monitors and televisions to receive and display broadcasting signals.

Despite various technical developments in LCD technology having applications in different fields, research in enhancing the picture quality of the LCD device has been, in some respects, lacking as compared to other features and advantages of the LCD device. In order to use LCD devices in various fields as a general display, LCD devices should have a high quality picture, such as high resolution and high luminance with a large-sized screen, while still maintaining low weight, a thin profile, and low power consumption.

In general, the LCD device includes an LCD panel for displaying images and a driving part for applying a driving signal to the LCD panel. The LCD panel includes first and second substrates bonded to each other with a predetermined interval therebetween and a liquid crystal layer in the interval between the first and second substrates.

Moreover, the LCD device typically requires an additional light source. For example, a backlight assembly for emitting and guiding light is typically used in a transmitting type LCD device.

The backlight assembly may be classified into an edge type and a direct type.

In an edge type backlight assembly, silhouettes of light-emission lamps appear on the LCD panel. Thus, there must be a predetermined interval between the light-emission lamps and the LCD panel. Also, a light-scattering means is provided in the edge type backlight assembly for uniformly scattering light. Accordingly, all the components increase the thickness of a profile in the LCD device of the direct type backlight assembly.

Also, as the size of the LCD panel increases, the size of a light-emission area in the backlight assembly increases. Where a large-sized direct type backlight assembly is used, it is difficult to obtain a flat light-emission area if the light-scattering means does not have a sufficient thickness. Thus, it is necessary to provide a light-scattering means having a sufficient thickness.

In the edge type backlight assembly, light-emission lamps are formed at one side of a light-guiding plate, and light is dispersed on an entire surface of the LCD panel by the light-guiding plate. Problems related to edge type backlight assembly include low luminance since the light-emission lamps are provided at one side of the light-guiding plate and the light is transmitted through the light-guiding plate. Also, complicated techniques for designing and fabricating the light-guiding plate are required in order to obtain a uniform luminous intensity in the LCD device having the edge type backlight assembly.

Accordingly, a direct type backlight assembly is generally applied to an LCD device that requires high luminance. Furthermore, the edge type backlight assembly is generally used for a notebook PC or a monitor PC which requires a thin profile.

Hereinafter, a direct type backlight assembly according to the related art will be described with reference to the accompanying drawings.

FIG. 1 is a perspective view of a direct type backlight assembly according to the related art. FIG. 2 is a cross sectional view along line I-I' of FIG. 1.

As shown in FIG. 1 and FIG. 2, a direct type backlight assembly according to the related art includes a plurality of lamps 111, a side supporter 108, a protection cap 105, a PCB 104, a cover shield 103, a first supporter 106a, a second supporter 106b, and a wire 107.

At this time, the plurality of lamps 111 are arranged at fixed intervals along one direction inside an outer case 102. Then, the side supporter 108 is provided at one side of the outer case 102, wherein the side supporter 108 has a plurality of U-shaped curved portions, each for supporting one end of a lamp of the plurality of lamps 111. Also, the protection cap 105 is provided between each inner wall of a U-shaped curved portion in the side supporter 108 and each end of the lamp. The PCB 104, in which an inverter (not shown) is mounted, is formed at a rear corner of the outer case 102. The cover shield 103 protects each end of the lamps 111 and the first PCB 104, wherein the cover shield 103 has one bent edge 103a for covering each end of the lamps 111, and a second bent edge 103b for covering one rear edge of the outer case 102.

In addition, the first supporter 106a protrudes from the protection cap 105 toward the one bent edge 103a of the cover shield 103, wherein the first supporter 106a has a via-hole. The second supporter 106b protrudes from the protection cap 105 perpendicular to the first supporter 106a, and extends toward the second bent edge 103b of the cover shield 103 through the outer case 102. Also, the second supporter 106b has a via-hole. The wire 107 electrically connects the electrode 120 formed at one end in each of the lamps 111 with the inverter of the PCB 104 by the via-holes of the first and second supporters 106a and 106b.

Furthermore, first and second protrusions 177a and 177b are formed on opposite surfaces of the outer case 102 and the other edge 103b of the cover shield 103, respectively. The first protrusion 177a is connected with the second protrusion 177b by a screw 190, whereby the cover shield 103 and the outer case 102 are fixed to each other.

In addition, although not shown, the direct type backlight assembly according to the related art includes another side supporter, another protection cap, another PCB, another cover shield 146, another first supporter, another second supporter, and another wire.

The side supporter is provided at the other side of the outer case 102, wherein the side supporter has a plurality of U-shaped curved portions, each for supporting a second end of each of the lamps 111. The protection cap is provided between each inner wall of the U-shaped curved portions in the side supporter and the other end in each of the lamps 111 to protect an electrode in the second end of the lamp. Then, the PCB, in which an inverter (not shown) is mounted, is formed at the other rear corner of the outer case 102. The cover shield 146 protects the other end in each of the lamps 111 and the PCB, wherein the cover shield 146 has a first edge 146a for covering the second end of each of the lamps 111, and a second edge 146b for covering a second rear edge of the outer case 102.

The first supporter protrudes from the protection cap towards the first edge 146a of the cover shield 146, wherein the first supporter has a via-hole. The second supporter protrudes from the protection cap perpendicular to the first supporter and extends toward the other edge 146b of the cover shield 146 through the outer case 102. In this case, the second supporter also has a via-hole. The wire electrically connects the electrode formed at the other end in each of the lamps 111 with the inverter of the PCB by the via-holes of the first and second supporters.

In addition, first and second protrusions 199 are formed on opposite surfaces of the outer case 102 and the second edge 146b of the cover shield 146. The first protrusion is connected with the second protrusion by a screw, whereby the cover shield 146 and the outer case 102 are fixed to each other.

The protection cap 105 protects the electrodes 120 formed at both ends in each of the lamps 111. For this, the protection cap 105 is formed of rubber. The first and second supporters 106a and 106b are formed as one body with the protection cap, whereby the first and second supporters are formed of rubber.

Furthermore, a reflective sheet (not shown) is provided on an upper surface of the outer case 102, so as to reflect the light emitted from the lamps 111 toward a display part of an LCD panel 100.

Referring to FIG. 2, optical sheets 110 of a light-diffusion sheet 110a and a polarizing film 110b are provided on an upper surface of the side supporter 108. The light-diffusion sheet 110a receives the light emitted from the lamps 111 and uniformly diffuses the light. The polarizing film 110b receives the light diffused by the light-diffusion sheet 110a and provides the light to the display part of the LCD panel 100 after improving luminance.

A side panel 109 is provided between the optical sheets 110 and the LCD panel 100. The side panel 109 covers the upper edges of the optical sheets 110 and the lower edge of the LCD panel 100.

In the direct type backlight assembly according to the related art, a top case 101 is provided to cover the upper edge of the LCD panel 100 and the lateral side of the side panel 109. The top case 101 fixes the LCD panel 100 and the side panel 109.

However, the direct type backlight assembly according to the related art has several disadvantages, as illustrated in FIG. 3.

FIG. 3 is a cross sectional view showing deformation of a cover shield. In addition, FIG.3 show the disconnection of a wire in a backlight assembly according to the related art when applying an external force.

In the direct type backlight assembly according to the related art, since the cover shield 103 is formed of metal, one edge 103a of the cover shield 103 may be bent toward the lamp 111 when the external force is applied to one edge 103a of the cover shield 103.

When the cover shield 103 deforms, one edge 103a of the cover shield 103 presses the first supporter 106a. Thus, the first supporter 106a flexes against one end of the lamp 111. In this state, the wire 107 passing through the via-hole of the first supporter 106a is also inserted toward one end of the lamp 111, whereby the corner of the outer case 102 is exposed. When the wire 107 is in contact with the corner of the outer case 102, the wire 107 is damaged by the external force. If a large external force is applied, the wire 107 may be disconnected. Furthermore, the wire, which is connected with the electrode formed at the other end of the lamp 111, may be damaged due to the deformation of the cover shield 146.

SUMMARY OF THE INVENTION

Accordingly, the present invention is directed to a backlight assembly that substantially obviates one or more problems due to limitations and disadvantages of the related art.

An advantage of the present invention is to provide a backlight assembly in which protrusions are formed in a surface between a side supporter and a cover shield to prevent the cover shield deformation from an external force, and to prevent disconnection of a wire positioned between the side supporter and the cover shield.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these advantages and in accordance with the purpose of the invention, as embodied and broadly described herein, a backlight assembly includes a plurality of light sources arranged at fixed intervals inside an outer case; a side supporter that includes a plurality of U-shaped curved portions at a side of the outer case and substantially aligned with the light sources; a printed circuit board (PCB) on which a plurality of inverters are mounted; a plurality of wires, wherein each inverter is coupled with an electrode of each light source by a respective one of the plurality of wires; a cover shield including first edge or side for covering a lateral side of the outer case a second edge or side for covering the rear edge or side of the outer case; and an extension formed on one surface of the side supporter in opposite to one edge or side of the cover shield. The extension protrudes from the side supporter where the side supporter opposes the first side of the cover shield.

In another aspect of the present invention, a backlight assembly includes a plurality of light sources arranged at fixed intervals inside an outer case; a first side supporter that includes a plurality of U-shaped curved portions substantially aligned with first respective ends of the plurality of light sources, the first side supporter at one side of the outer case thereby supporting the plurality of light sources; a second side supporter that includes a plurality of U-shaped curved portions substantially aligned with respective second ends of the plurality of light sources, the second side supporter at a second side of the outer case so as to support the light sources; a first PCB on which a plurality of first inverters are mounted; a second PCB on which a plurality of second inverters are mounted; a plurality of wires for electrically connecting a first electrode of each respective light source of the plurality of light sources with a respective first inverter of the plurality of first inverters and electrically connecting a second electrode of each respective light source of the plurality of light sources with a respective second inverter of the plurality of second inverters; a first cover shield including a first side for covering the first ends of the plurality of light sources and a second side for covering a first rear side of the outer case; a second cover shield including a first side for covering the second ends of the plurality of light sources and a second side for covering the rear edge of the outer case; a plurality of first extensions extending from the first side supporter toward the first side of the first cover shield, so as to prevent contact between the first cover shield and the first side supporter; and a plurality of second extensions extending from the second side supporter toward the first side of the second cover shield, so as to prevent contact between the second cover shield and the second side supporter.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, a backlight assembly according to the present invention will be described with reference to the accompanying drawings.

Figure 1:
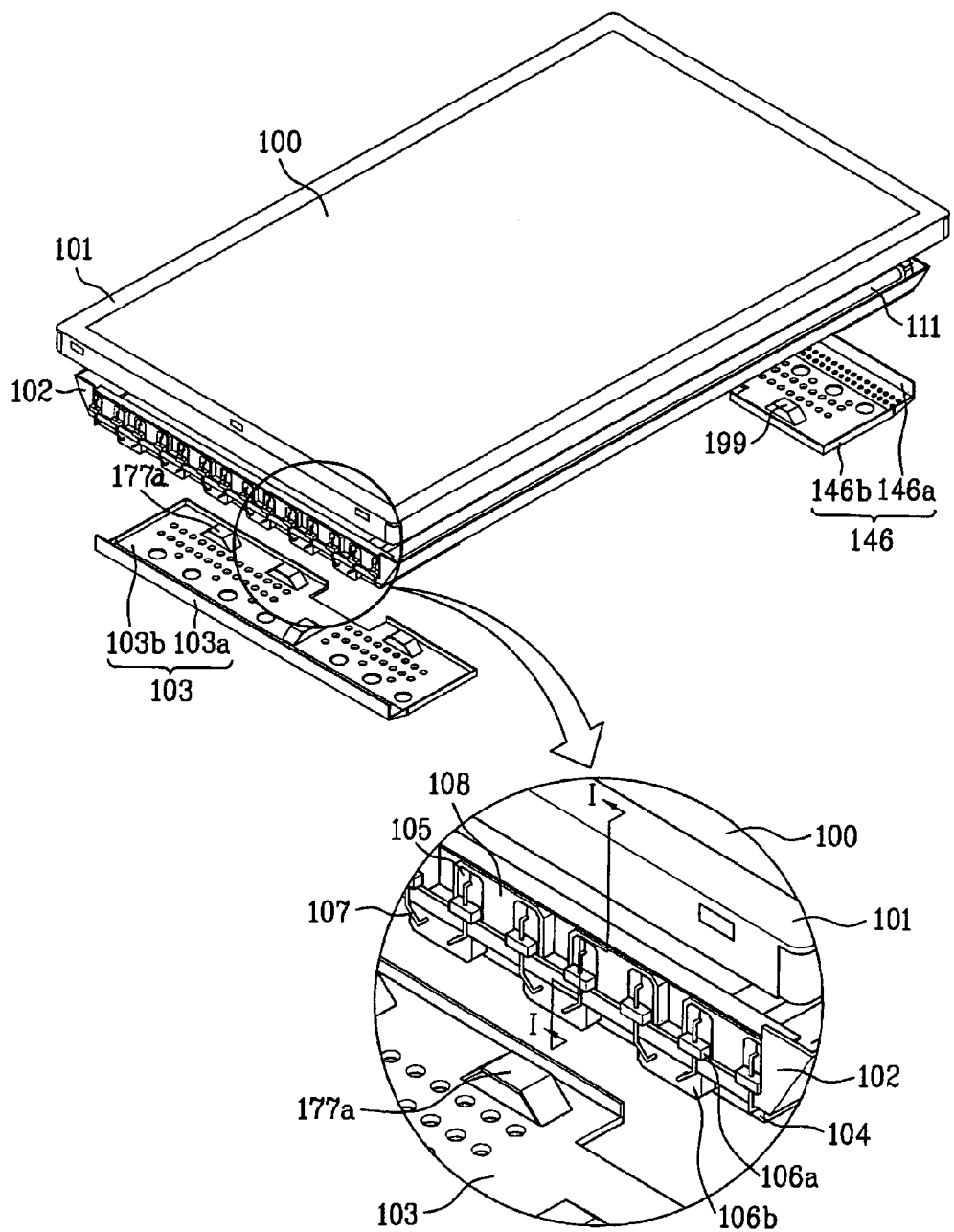
FIG. 1 is a perspective view illustrating a direct type backlight assembly according to the related art.
Figure 2:
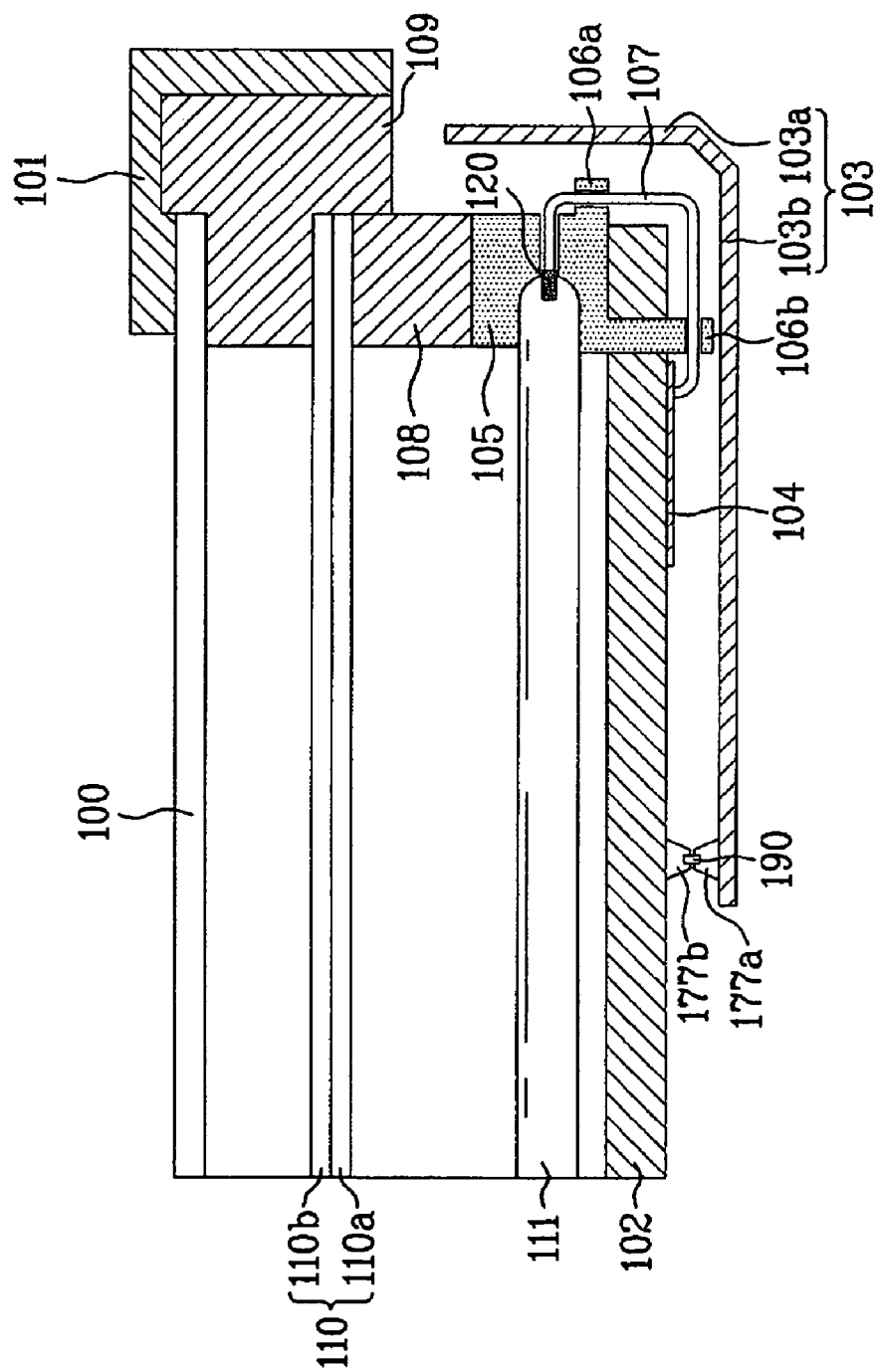
FIG. 2 is a cross sectional view along line I-I' of FIG. 1.
Figure 3:
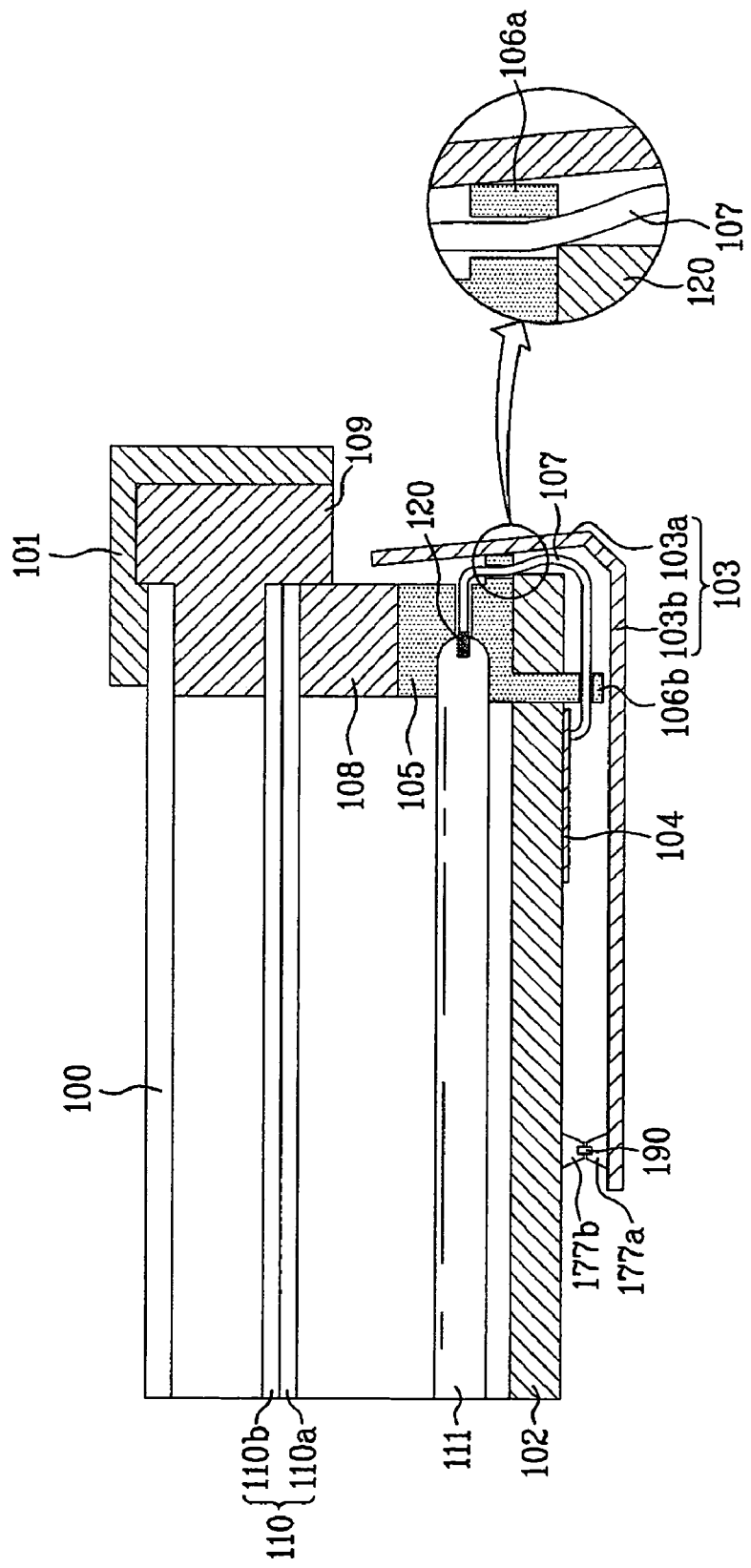
FIG. 3 is a cross sectional view illustrating a deformation of a cover shield and a wire disconnection in a backlight assembly according to the related art.
Figure 4:
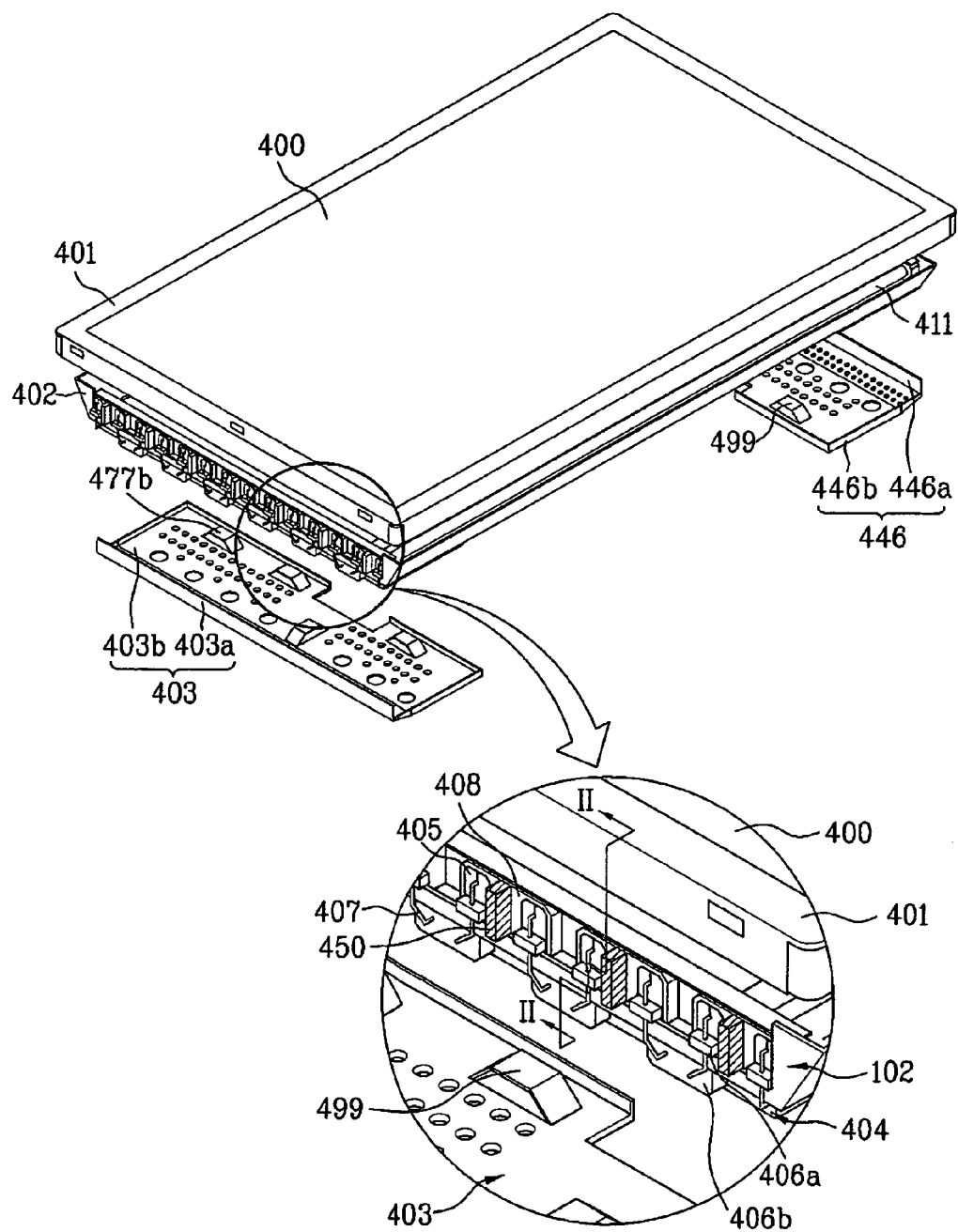
FIG. 4 is a perspective view illustrating a backlight assembly according to the first embodiment of the present invention.
Figure 5:
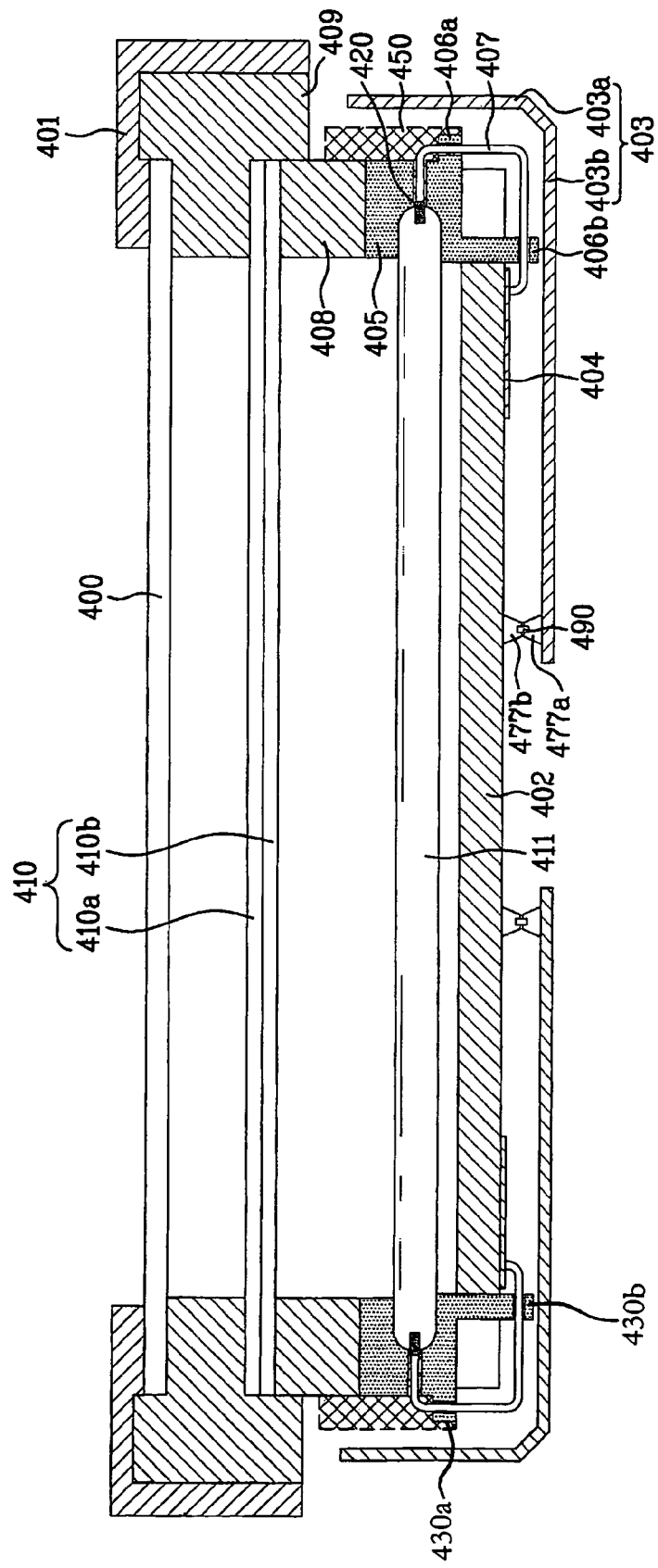
FIG. 5 is a cross sectional view along a line II-II' of FIG. 4.

FIG. 4 is a perspective view illustrating a backlight assembly according to an embodiment of the present invention. FIG. 5 is a cross sectional view illustrating a backlight assembly along a line II-II' of FIG. 4.

As shown in FIG. 4 and FIG. 5, a backlight assembly according to an embodiment of the present invention includes a plurality of lamps 411, a first side supporter 408, a first protection cap 405, a first PCB 404, a first cover shield 403, a first supporter 406a, a second supporter 406b, a first wire 407, and a first extension 450.

At this time, the plurality of lamps 411 are arranged at fixed intervals inside an outer case 402. The first side supporter 408 is provided at one side of the outer case 402 and has a plurality of U-shaped curved portions. The U-shaped curved portions support an end of a lamp of the lamps 411. The first protection cap 405 is provided between each inner wall of the U-shaped curved portions in the first side supporter 408 and each one end of the lamps 411 in order to protect an electrode 420 formed at each lamp of the lamps 411. The first PCB 404, in which an inverter is mounted, is formed at a rear corner of the outer case 402. The first cover shield 403 protects each one end of the lamps 411 and the first PCB 404, wherein the first cover shield 403 has a first edge or side 403a for covering each end of the lamps 411, and a second edge or side 403b for covering one rear edge or side of the outer case 402.

The first supporter 406a protrudes from the first protection cap 405 toward the first edge 403a of the first cover shield 403, wherein the first supporter 406a has a via-hole. The second supporter 406b protrudes from the first protection cap 405 perpendicular to the first supporter 406a and extends toward the second edge 403b of the first cover shield 403 through the outer case 402. In this embodiment, the second supporter 406b also has a via-hole. The first wire 407 electrically connects the electrode 420 formed at one end of each of the lamps 411 with the inverter of the first PCB 404 through the via-holes of the first and second supporters 406a and 406b. The first extension 450 extends from the first side supporter 408 toward the first edge 403a of the first cover shield 403.

In addition, first and second protrusions 477a and 477b are formed on surfaces opposite to the outer case 402 and the second edge 403b of the first cover shield 403. The first protrusion 477a connects with the second protrusion 477b by a screw 490, whereby the first cover shield 403 and the outer case 402 are fixed to each other.

Furthermore, the backlight assembly according to an embodiment of the present invention includes a second side supporter, a second protection cap, a second PCB, a second cover shield 446, a third supporter 430a (See FIG. 5), a fourth supporter 430b (See FIG. 5), a second wire, and a second extension.

The second side supporter is at the other side of the outer case 402, wherein the second side supporter has a plurality of U-shaped curved portions, each for supporting a second end of each of the lamps 411. To protect an electrode formed at the second end of each of the lamps 411, the second protection cap is provided between each inner wall of the U-shaped curved portions in the second side supporter and the second end of each of the lamps 411. The second PCB, in which an inverter is mounted, is formed at a second rear corner of the outer case 402. The second cover shield 446 protects the second end of each of the lamps 411 and the second PCB, wherein the second cover shield 446 has a first edge 446a for covering the second end of each of the lamps 411 and a second edge 446b for covering the other rear edge of the outer case 402.

The third supporter protrudes from the second protection cap toward the first edge 446a of the second cover shield 446, wherein the third supporter has a via-hole. The fourth supporter protrudes from the second protection cap perpendicular to the third supporter and extends toward the second edge 446b of the second cover shield 446 through the outer case 402. Also, the fourth supporter has a via-hole. The second wire electrically connects the electrode formed at the other end in each of the lamps 411 with the inverter of the second PCB by the via-holes of the third and fourth supporters. The second extension extends from the second side supporter toward one edge 446a of the second cover shield 446.

In addition, third and fourth protrusions 499 are formed on opposite surfaces of the outer case 402 and the other edge 446b of the second cover shield 446. The third protrusion connects with the fourth protrusion by a screw, whereby the second cover shield 446 and the outer case 402 are fixed to each other.

In the meantime, as explained above, the first and second protection caps are provided to protect the electrodes 420 formed at ends of each of the lamps 411. The first and second protection caps are formed of rubber in order to provide protection. The first to fourth supporters are formed as one body with the first and second protection caps, whereby the first to fourth supporters are formed of rubber.

Furthermore, a reflective sheet (not shown) is provided on an upper surface of the outer case 402, so as to reflect the light emitted from the lamps 411 toward a display part of an LCD panel 400.

Also, optical sheets 410 having a light-diffusion sheet 410a and a polarizing film 410b are provided on an upper surface of the first and second side supporters. The light-diffusion sheet 410a receives the light emitted from the lamps 411 and uniformly diffuses the light. The polarizing film 410b receives the light diffused by the light-diffusion sheet 410a and sends the light to the display part of the LCD panel 400 after improving the luminance of light.

In addition, a side panel 409 is provided between the optical sheets 410 and the LCD panel 400, wherein the side panel 409 covers the upper edges of the optical sheets 410 and the lower edge of the LCD panel 400.

In the backlight assembly according to an embodiment of the present invention, a top case 401 is provided to cover the upper edge of the LCD panel 400 and the lateral side of the side panel 409. The top case 401 fixes the LCD panel 400 and the side panel 409.

In the meantime, the second or fourth supporter is formed as one body with the first or second protection cap. That is, two of the first protection caps which are adjacent to one another use one second supporter, and two of second protection caps which are adjacent to each other use one fourth supporter.

The case of applying an external force to one edge of the first or second cover shield 403 or 446 in the backlight assembly according to an embodiment of the present invention will be explained as follows.

Figure 6:
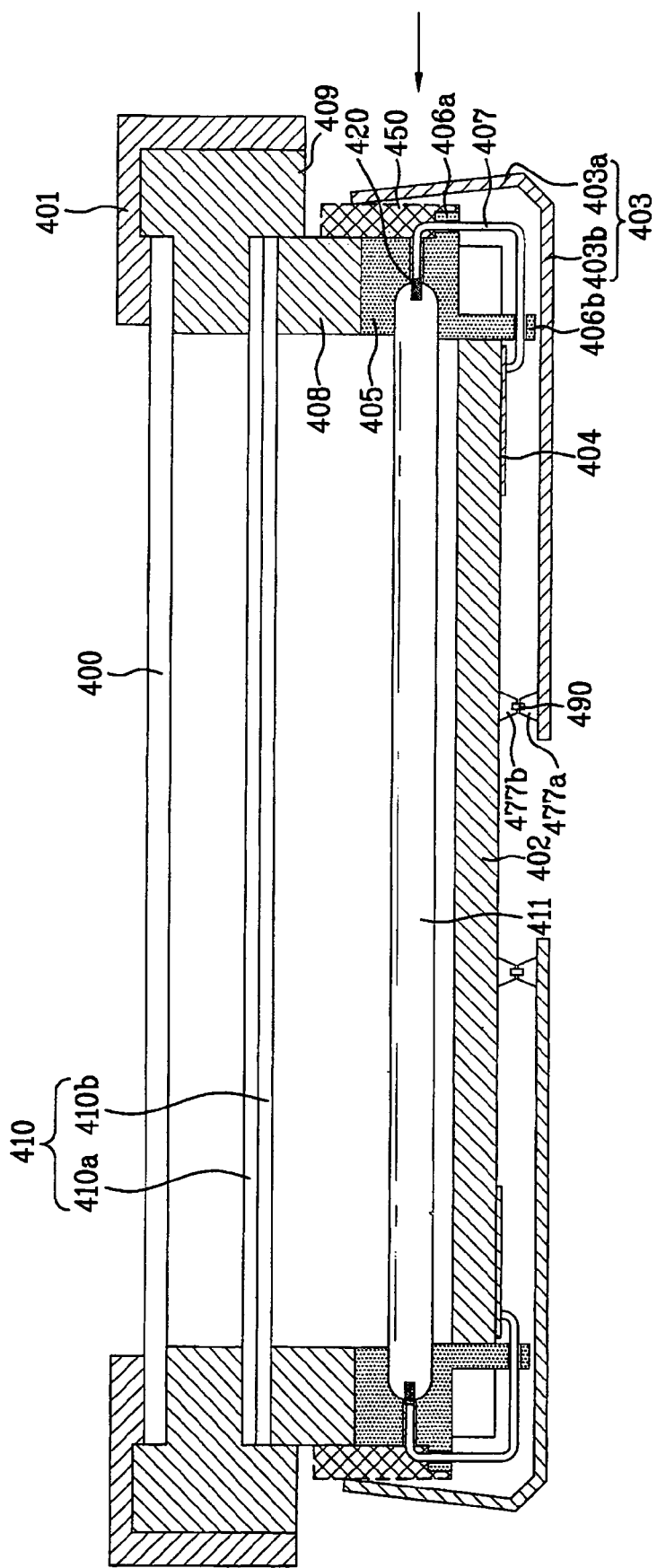
FIG. 6 is a cross sectional view illustrating a wire disconnection prevention structure with a protrusion in a backlight assembly according to the present invention.

FIG. 6 is a cross sectional view explaining the wire disconnection prevention structure with the protrusion in the backlight assembly according to the present invention when an external force is applied to one edge of the cover shield.

When an external force is applied to the first edge 403a of the first cover shield 403, the first edge 403a of the first cover shield 403 bends toward one end of the lamp 411. Then, the first edge 403a of the first cover shield 403 contacts the first extension 450. Thus, as may be seen in FIG. 6, the present invention prevents the first edge 403a of the first cover shield 403 from contacting an end of the lamp 411. Accordingly, the external force is not transmitted to the first supporter 406a and the first wire 407, thereby preventing disconnection of the first wire 407.

The first extension 450 and the first side supporter 408 may be formed of the same material. Accordingly, the first extension 450 is formed together with the first side supporter 408. As may be seen in FIG. 6, the first extension 450 protrudes further than the first supporter 406a formed in the first protection cap 405 from the first side supporter. Thus, when the first edge 403a of the first cover shield 403 is bent toward one end of the lamp 411 by the external force, the first edge 403a of the first cover shield 403 does not contact the first supporter 406a.

Also, even though the external force is applied to one edge 446a of the second cover shield 446, the external force is not transmitted to the second wire. That is, it is possible to prevent disconnection of the second wire.

As mentioned above, the backlight assembly according to the present invention has the following advantages.

In the backlight assembly according to the present invention, the side supporter has an extension which protrudes toward an edge of the cover shield. Accordingly, even if an external force is applied to an edge of the cover shield, it is possible to prevent the edge of the cover shield from contacting the supporter of the protection cap. Thus, it is possible to prevent the wire passing through the supporter from being damaged.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight assembly, comprising:
   a plurality of light sources arranged at fixed intervals inside an outer case;
   a first side supporter that includes a plurality of U-shaped curved portions substantially aligned with respective first ends of the plurality of light sources, the first side supporter at one side of the outer case thereby supporting the plurality of light sources;
   a second side supporter that includes a plurality of U-shaped curved portions substantially aligned with respective second ends of the plurality of light sources, the second side supporter at a second side of the outer case thereby supporting the plurality of light sources;
   a first printed circuit board (PCB) on which a plurality of first inverters are mounted;
   a second printed circuit board(PCB) on which a plurality of second inverters are mounted;
   a plurality of wires for electrically connecting a first electrode of each respective light source of the plurality of light sources with a respective first inverter of the plurality of first inverters and electrically connecting a second electrode of each respective light source of the plurality of light source with a respective second inverter of the plurality of second inverters;
   a first cover shield including a first side for covering the first ends of the plurality of light sources, the first cover shield having a second side for covering a first rear side of the outer case;
   a second cover shield including a first side for covering the second ends of the plurality of light sources, the second cover shield having a second side for covering a second rear side of the outer case;
   a plurality of first extensions extending from the first side supporter toward the first side of the first cover shield, thereby preventing contact between the first cover shield and the first side supporter; and
   a plurality of second extensions extending from the second side supporter toward the first side of the second cover shield, thereby preventing contact between the second cover shield and the second side supporter.

2. The backlight assembly of claim 1, further comprising:
a first protection cap between inner walls of the U-shaped curved portions in the first side supporter and each light source of the plurality of light sources, the first protection cap protecting electrodes of the plurality of light sources; and
a second protection cap between inner walls of the U-shaped curved portions in the second side supporter and each light source of the plurality of light sources, the second protection cap protecting electrodes of the plurality of light sources.

3. The backlight assembly of claim 2, further comprising:
a first supporter including a via-hole and protruding from the first protection cap toward the first side of the first cover shield;
a second supporter including a via-hole and protruding from the first protection cap toward the first side of the first cover shield;
a third supporter including a via-hole and protruding from the second protection cap toward the first side of the second cover shield; and
a fourth supporter including a via-hole and protruding from the second protection cap toward the second side of the second cover shield.

4. The backlight assembly of claim 3, wherein the plurality of wires electrically connect the first electrode of each respective light source of the plurality of light sources with each respective first inverter of the plurality of first inverters through the via-holes of the first, and second supporter electrically connects the second electrode of each respective light source with each respective second inverter of the plurality of second inverters through the via-holes of the third and fourth supporters.

5. The backlight assembly of claim 1, wherein the plurality of first and second extensions extend closer to the first and second cover shields than the first, second, third, and fourth supporters.

6. The backlight assembly of claim 3, wherein the first and second supporters are unitary with the first protection cap, and the third and fourth supporters are unitary with the second protection cap.

7. The backlight assembly of claim 6, wherein the first, second, third, and fourth supporters are formed of rubber.

8. The backlight assembly of claim 1, further comprising;
a polarizing film; and
a light diffusion sheet.

* * * * *